(12) United States Patent
Villanova et al.

(10) Patent No.: US 6,459,946 B1
(45) Date of Patent: Oct. 1, 2002

(54) METHOD AND SYSTEM FOR DETERMINING OPERATOR STAFFING

(75) Inventors: Francisco Javier Bonal Villanova; Manuel Fernandez Romero, both of Madrid (ES)

(73) Assignee: Agere Systems Guardian Corp., Orlando, FL (US)

(*) Notice: Subject to any disclaimer, the term of this patent is extended or adjusted under 35 U.S.C. 154(b) by 0 days.

(21) Appl. No.: 09/439,048

(22) Filed: Nov. 12, 1999

(51) Int. Cl.$^7$ .................................................. G06F 19/00
(52) U.S. Cl. ........................ 700/111; 700/108; 702/182
(58) Field of Search .................... 700/121, 97, 99–104, 700/111, 106, 107, 108; 702/182

(56) References Cited

U.S. PATENT DOCUMENTS

| | | | | |
|---|---|---|---|---|
| 5,140,537 A | | 8/1992 | Tullis | 703/6 |
| 5,212,635 A | * | 5/1993 | Ferriter | 705/11 |
| 5,442,561 A | | 8/1995 | Yoshizawa et al. | 700/100 |
| 5,444,632 A | | 8/1995 | Kline et al. | 707/81 |
| 5,615,138 A | | 3/1997 | Tanaka et all. | 702/81 |
| 5,617,342 A | | 4/1997 | Elazouni et al. | 703/6 |
| 5,826,236 A | * | 10/1998 | Narimatsu et al. | 705/8 |
| 5,971,585 A | * | 10/1999 | Dangat et al. | 700/102 |
| 6,041,267 A | * | 3/2000 | Dangat et al. | 700/107 |
| 6,049,742 A | * | 4/2000 | Milne et al. | 700/99 |
| 6,088,626 A | * | 7/2000 | Lilly et al. | 700/100 |
| 6,115,640 A | * | 9/2000 | Tarumi | 700/99 |
| 6,249,715 B1 | * | 6/2001 | Yuri et al. | 700/111 |
| 6,259,959 B1 | * | 7/2001 | Martin | 700/99 |

* cited by examiner

*Primary Examiner*—Leo Picard
*Assistant Examiner*—Zoila Cabrera
(74) *Attorney, Agent, or Firm*—Allen, Dyer, Doppelt, Milbrath & Gilchrist, P.A.

(57) ABSTRACT

A method and system for determining a total number of operators needed at a semiconductor wafer work center to achieve a wafer manufacturing goal is provided. The work center includes a wafer lot tracking system and a plurality of processing stations for processing a plurality of lots of semiconductor wafers to be manufactured. A highest operator throughput as a maximum rate of wafers that can be processed per operator based on data from the lot tracking system is determined, and a minimum number of operators that are needed to process wafers in the work center to achieve the manufacturing goal based on the wafer manufacturing goal and the highest operator throughput is determined. Furthermore, a determination is made of a number of working operators needed to process wafers in the semiconductor wafer work center to achieve the wafer manufacturing goal by increasing the minimum number of operators based on characteristics of the processing stations. An operator availability based on an average number of working operators and a number of all operators at the work center is also determined. The total number of operators needed at the semiconductor wafer work center to achieve the wafer manufacturing goal is then determined based on the operator availability and the number of working operators.

39 Claims, 3 Drawing Sheets

THROUGHPUT VARIATION AS FUNCTION OF STAFFING

METHOD AND SYSTEM FOR DETERMINING OPERATOR STAFFING

FIELD OF THE INVENTION

The present invention relates to the field of product manufacturing, and, more particularly, to manufacturing of semiconductor wafers.

BACKGROUND OF THE INVENTION

Manufacturing Information Systems (MISs) are systems that contain data and data processing methods that aid manufacturing managers in production planning and execution. For example, an MIS typically contains demand data, supply data, cost data, and bill-of-material data. Manufacturing Resource Planning (MRP), Capacity Requirements Planning (CRP) and Enterprise Resource Planning (ERP) are types of MISs. An MIS is primarily a data management system. Most important manufacturing decisions are still ultimately made by humans; however, software that processes all the relevant data and uses mathematical techniques to determine optimal, feasible production plans can save millions of dollars for manufacturers.

ERPs may track and manage a multi-profile workforce, process attendance parameters, allocate actual cost records, optimize resource utilization and measure labor productivity throughout the enterprise. Furthermore, workplace logistics, production planning, material management, sales, project accounting, human resources and payroll may also be managed with such systems.

Semiconductor devices, also called integrated circuits, are manufactured and mass produced by fabricating identical circuit patterns on a single semiconductor wafer. During the process, the wafer is cut into identical dies or chips. Although commonly referred to as semiconductor devices, the devices are fabricated from various materials, including conductors (e.g. copper, aluminum and tungsten), non-conductors (e.g. silicon dioxide) and semiconductors (e.g. silicon). Within an integrated circuit, thousands of devices (e.g., transistors, diodes) are formed.

In a semiconductor fabrication plant (fab), the integrated circuit devices with their various conductive layers, semiconductive layers, insulating layers, contacts and interconnects are formed by fabrication processes, including doping processes, deposition processes, photolithographic processes, etching processes and other processes. Many operators are needed at various process stations (e.g. a group of machines) in the fab to sustain a given production volume.

For example, U.S. Pat. No. 5,140,537 to Tullis and entitled "Modeling as Factory with Human Operators and Validating the Model" is directed to a computer simulation of a semiconductor factory. The simulation includes comparatively evaluating individual lots as they move through process sequences over time. Historical records of staffing are used to determine staff levels to include in the model.

Additionally, a typical semiconductor fab includes a lot tracking system. A lot is a group of wafers which are typically processed together. Computer software running on a local area network is used to collect data regarding product flow in order to keep track of individual and groups of lots as they move through the processing stations in a work center. For example, AccuFACTS 9000 from Santa Barbara Analysis, Inc., of Valencia, Cal. is a shop floor lot tracking software product which collects real time data regarding works in progress, lot locations and processing station inventory, for example.

Typically, in the semiconductor manufacturing industry, the number of operators needed is calculated through the use of time studies. Such time studies are based on the detailed observation of all the operators activities, the classification of the activities, and the measurement or estimation of the time needed to perform all of them. These studies are very slow and expensive, and they are discontinuous and thus do not provide frequent or accurate tracking of manpower.

SUMMARY OF THE INVENTION

In view of the foregoing background, it is therefore an object of the invention to provide a method and system for quickly and continuously determining a total number of operators needed at a work center to achieve a manufacturing goal.

This and other objects, features and advantages in accordance with the present invention are provided by a method of determining a total number of operators needed at a semiconductor wafer work center to achieve a wafer manufacturing goal. The work center includes a wafer lot tracking system and a plurality of processing stations for processing a plurality of lots of semiconductor wafers to be manufactured. The method includes the steps of setting the wafer manufacturing goal, determining a highest operator throughput as a maximum rate of wafers that can be processed per operator based on data from the lot tracking system, and determining a minimum number of operators that are needed to process wafers in the work center to achieve the manufacturing goal based on the wafer manufacturing goal and the highest operator throughput.

The method further includes the determination of a number of working operators needed to process wafers in the semiconductor wafer work center to achieve the wafer manufacturing goal by increasing the minimum number of operators based on characteristics of the processing stations. An operator availability based on an average number of working operators and a number of all operators at the work center is also determined. The total number of operators needed at the semiconductor wafer work center to achieve the wafer manufacturing goal is then determined based on the operator availability and the number of working operators.

The step of determining the total number of operators needed at the semiconductor wafer work center to achieve the wafer manufacturing goal may also be based on a work center operating time and a working time per operator. Also, the step of determining the total number of operators needed at the semiconductor wafer work center to achieve the wafer manufacturing goal may comprise multiplying the quotient of the number of working operators needed divided by the operator availability, by the quotient of the work center operating time divided by the working time per operator. The step of setting the wafer manufacturing goal may be based on a rate of wafers that can be started in a product flow and a number of process steps in the product flow.

Additionally, the step of determining the number of working operators may comprise dividing the minimum number of operators by an operator cushion. The operator cushion is preferably between 0 and 1 and may be a historical factor. The step of determining the minimum number of operators may comprise dividing the wafer manufacturing goal by the highest operator throughput. Also, the step of determining the operator availability may comprise dividing the average number of working operators by the number of all operators at the work center.

The objects, features and advantages in accordance with the present invention are also provided by a system for determining a total number of operators needed at a semiconductor wafer work center to achieve a wafer manufacturing goal. Again, the work center includes a wafer lot tracking system and a plurality of processing stations for processing a plurality of lots of semiconductor wafers to be manufactured. The system includes means for determining a highest operator throughput as a maximum rate of wafers that can be processed per operator based on data from the lot tracking system, and means for determining a minimum number of operators that are needed to process wafers in the work center to achieve the manufacturing goal based on the wafer manufacturing goal and the highest operator throughput.

The system also includes means for determining a number of working operators that are needed to process wafers in the work center to achieve the wafer manufacturing goal by increasing the minimum number of operators based on characteristics of the processing stations, and means for determining an operator availability based on an average number of working operators and a number of all operators at the work center. Furthermore, the system includes means for determining the total number of operators needed at the semiconductor wafer work center to achieve the wafer manufacturing goal based on the operator availability and the number of working operators.

The means for determining the total number of operators needed at the semiconductor work center to achieve the wafer manufacturing goal may also be based on a work center operating time and a working time per operator. The means for determining the total number of operators needed at the semiconductor work center to achieve the wafer manufacturing goal may be for multiplying the quotient of the number of working operators needed divided by the operator availability, by the quotient of the work center operating time divided by the working time per operator. Again, the wafer manufacturing goal may be based on a rate of wafers that can be started in a product flow and a number of process steps in the product flow.

The means for determining the number of working operators may be for dividing the minimum number of operators by an operator cushion. Again, the operator cushion is preferably between 0 and 1 and may be a historical factor. Also, the means for determining the minimum number of operators may be for dividing the wafer manufacturing goal by the highest operator throughput, and the means for determining the operator availability may be for dividing the average number of working operators by the number of all operators at the work center.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring to FIGS. 1–5, the method and system 10 for determining a total number of operators needed at a semiconductor wafer work center to achieve a wafer manufacturing goal, will be described. The work center includes a wafer lot tracking system 22 and a plurality of processing stations 24 operated by the a team of operators for processing a plurality of lots of semiconductor wafers to be manufactured as would be appreciated by those skilled in the art. Such processing stations 24 include, for example, doping process stations, deposition process stations, photolithographic process stations, etching process stations and other process stations as are conventionally known.

Figure 1:
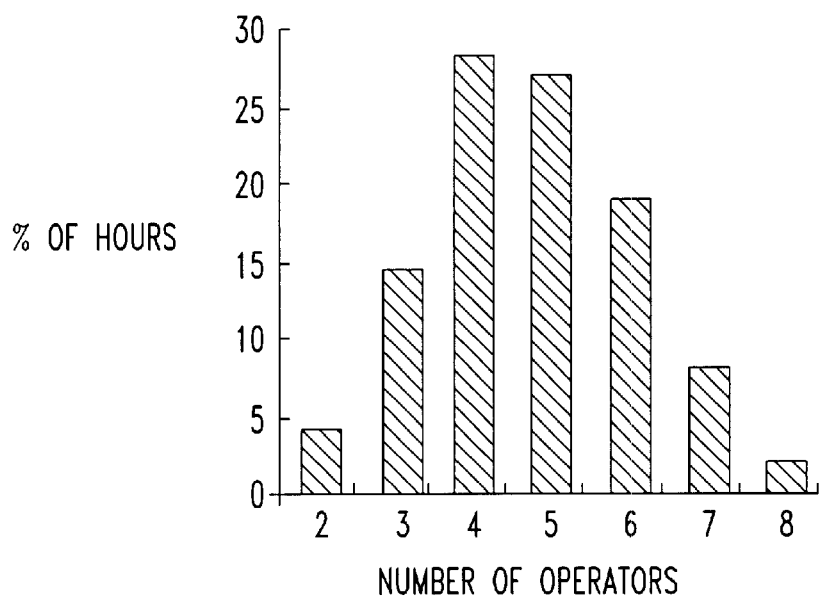
FIG. 1 is a bar graph illustrating an example of the staffing variability for a work center.

The method and system 10 automatically provide for the quantification of the total number of operators needed without direct observation. This reduces costs, decreases the time needed, and allows for a continuous tracking of manpower. The method and system 10 use data from the computerized lot tracking system 22 in the work center, as discussed above. Data, from the lot tracking system 22 and corresponding to the variability of manpower in the work center, is used for certain measurements. For example, the number of different operators performing processes every hour and their distribution can be measured as represented by the graph of FIG. 1. An average number of working operators can be determined from the measurement and this graph.

Figure 2:
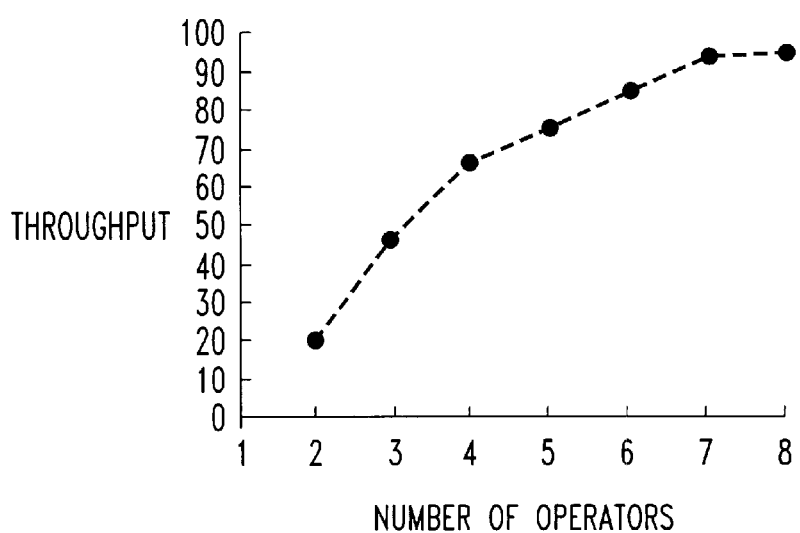
FIG. 2 is a graph illustrating an example of throughput variation with respect to staffing variation for a work center.
Figure 3:
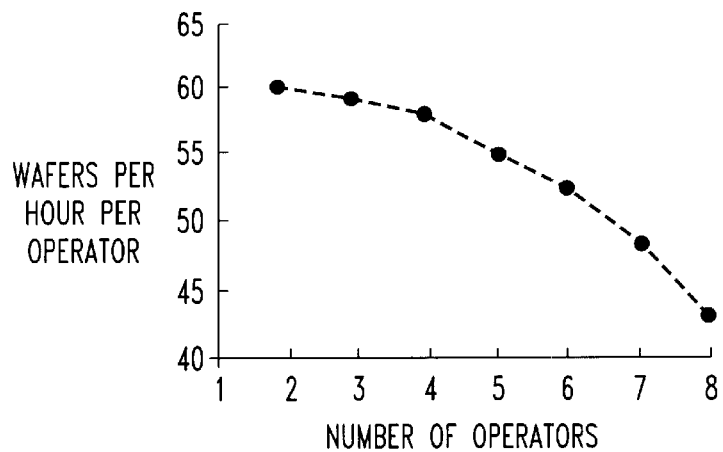
FIG. 3 is a graph illustrating an example of throughput per operator for a work center.

The average work center throughput changes for different staffing levels. Such data can also be obtained from the lot tracking system 22, as would readily be appreciated by those skilled in the art, and an example is represented in FIG. 2. As shown in the graph of FIG. 2, staffing variability has a significant impact in work center throughput. For example, with two operators, about 20 units may be processed, while about 100 units may be processed with seven or eight operators. From this data, the number of wafers processed by each operator per hour at each staffing level can be obtained, for example, as shown in the graph of FIG. 3. As shown, a higher operator throughput (i.e. throughput per operator) can be achieved with the minimum number of operators in the work center because each operator will likely always have an available processing station and the materials needed for the particular process.

Figure 4:
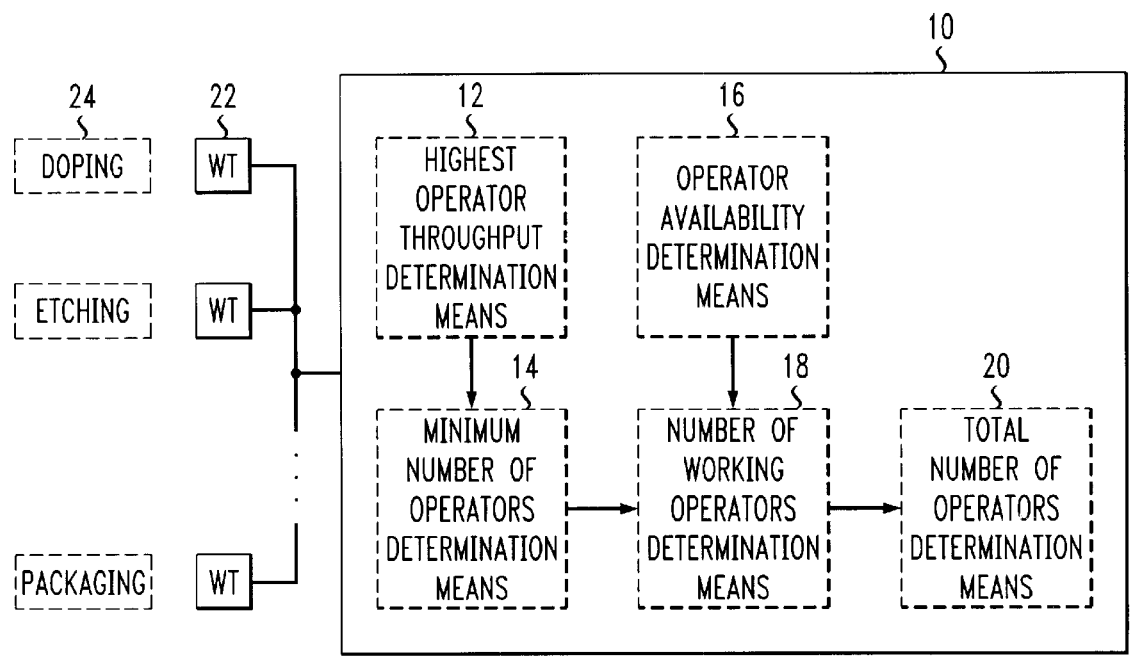
FIG. 4 is a block diagram illustrating a system for determining total number of operators needed at the work center to achieve a manufacturing goal in accordance with the present invention.
Figure 5:
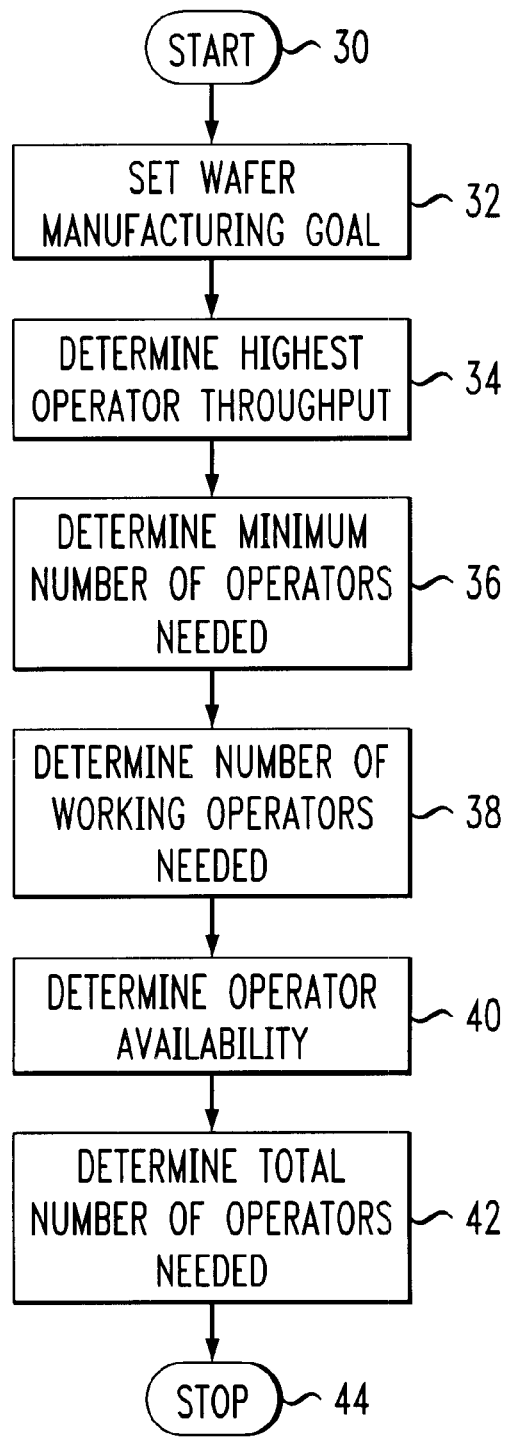
FIG. 5 is a flow chart illustrating the preferred steps for determining the total number of operators needed at the work center to achieve the manufacturing goal in accordance with the present invention.

With specific reference to FIGS. 4 and 5, the basic steps of the method, and the parts of the system 10 of the invention will now be described. The method begins at Block 30 and a manufacturing goal is set at Block 32. The manufacturing goal may be expressed, for example, in terms of wafers per hour (WPH) in a semiconductor fab. For example, WPH may be expressed as the summation of $S_r$ times $V_r$, for r from 1 to n; where $S_r$ is the number of wafers to be started per hour in the product flow r, and $V_r$ is the number of steps in the product flow r in a work center. The system 10 includes a highest-operator-throughput determination means 12 which determines the highest operator throughput (HOT) in Block 34 of the method. HOT may be defined as the maximum rate of wafers (e.g. wafers per hour) that can be processed per operator based on data from the lot tracking system, as can be seen in FIG. 3, for example.

The system 10 also includes a minimum-number-of-operators determination means 14 for determining a minimum number of operators (MOR) that are needed (Block 36) to process wafers in the work center to achieve the manufacturing goal based on the manufacturing goal and the highest operator throughput (HOT). In other words: MOR= WPH/HOT. MOR is may be defined as the minimum number of operators simultaneously processing wafers in the work center that are needed to achieve the manufacturing goal.

However, in a typical work center, processing stations may experience a certain amount of idle time due to the probability that they will wait to be loaded or unloaded while operators perform other tasks. Thus the system 10 includes a number-of-working-operators determination means 18 for determining a number of working operators needed (OR) to process wafers (Block 38) in the semiconductor wafer work center to achieve the wafer manufacturing goal by increasing the minimum number of operators (MOR) based on characteristics of the processing stations. These characteristics include process time, bottlenecks, etc. as would be appreciated by the skilled artisan. For example: OR=MOR/ C; where C is a an operator cushion based on experience (i.e. a historical factor). Typically, C would be between 0 and 1.

An operator availability (OA) based on an average number of working operators (M) and a number of all operators (P) at the work center is then determined (Block 40) by an operator-availability-determination-means 16. M is, for example, determined from the data represented in FIG. 1. Due to training, meetings, lunches, breaks etc., not all the operators at the fab are processing wafers. Thus, preferably: OA=M/P.

The total number of operators (S) needed at the semiconductor wafer work center to achieve the wafer manufacturing goal is then determined (Block 42) by the total-number-of-operators determination means 20 based on the operator availability (OA) and the number of working operators (OR) before ending the method at Block 44. The step (Block 42) of determining the total number of operators needed (S) may also be based on a work center operating time (OH) and a working time per operator (WH). For example, the step (Block 42) of determining the total number of operators needed (S) at the semiconductor wafer work center to achieve the wafer manufacturing goal may comprise multiplying the quotient of the number of working operators needed divided by the operator availability (OR/OA), by the quotient of the work center operating time divided by the working time per operator (OH/WH). In other words: S=(OR/OA)×(OH/OA).

The above described system 10 including the various means 12, 14, 16, 18, 20 is preferably implemented as computer software as would be understood by the skilled artisan. It may be a module of a computerized lot tracking system or Enterprise Resource Planning system. Additionally, the various means 12, 14, 16, 18, 20 may be embodied as a discrete logic circuit as also would be appreciated by those skilled in the art. Many modifications and other embodiments of the invention will come to the mind of one skilled in the art having the benefit of the teachings presented in the foregoing descriptions and the associated drawings.

Therefore, it is understood that the invention is not to be limited to the specific embodiments disclosed, and that modifications and embodiments are intended to be included within the scope of the appended claims.

That which is claimed is:

1. A method of determining a total number of operators needed at a semiconductor wafer work center to achieve a wafer manufacturing goal, the work center including a wafer lot tracking system and a plurality of processing stations for processing a plurality of lots of semiconductor wafers to be manufactured, the method comprising the steps of:
    setting the wafer manufacturing goal;
    determining a highest operator throughput as a maximum rate of wafers that can be processed per operator based on data from the lot tracking system;
    determining a minimum number of operators that are needed to process wafers in the work center to achieve the manufacturing goal based on the wafer manufacturing goal and the highest operator throughput;
    determining a number of working operators needed to process wafers in the semiconductor wafer work center to achieve the wafer manufacturing goal by increasing the minimum number of operators based on characteristics of the processing stations;
    determining an operator availability based on an average number of working operators and a number of all operators at the work center; and
    determining the total number of operators needed at the semiconductor wafer work center to achieve the wafer manufacturing goal based on the operator availability and the number of working operators.

2. A method according to claim 1, wherein the step of determining the total number of operators needed at the semiconductor wafer work center to achieve the wafer manufacturing goal is also based on a work center operating time and a working time per operator.

3. A method according to claim 2, wherein the step of determining the total number of operators needed at the semiconductor wafer work center to achieve the wafer manufacturing goal comprises multiplying the quotient of the number of working operators needed divided by the operator availability, by the quotient of the work center operating time divided by the working time per operator.

4. A method according to claim 1, wherein the step of setting the wafer manufacturing goal is based on a rate of wafers that can be started in a product flow and a number of process steps in the product flow.

5. A method according to claim 1, wherein the step of determining the number of working operators comprises dividing the minimum number of operators by an operator cushion.

6. A method according to claim 5, wherein the operator cushion is between 0 and 1.

7. A method according to claim 5, wherein. the operator cushion is a historical factor.

8. A method according to claim 1, wherein the step of determining the minimum number of operators comprises dividing the wafer manufacturing goal by the highest operator throughput.

9. A method according to claim 1, wherein the step of determining the operator availability comprises dividing the average number of working operators by the number of all operators at the work center.

10. A method of determining a total number of operators needed at a semiconductor wafer work center to achieve a wafer manufacturing goal, the work center including a wafer lot tracking system and a plurality of processing stations for processing a plurality of lots of semiconductor wafers to be manufactured, the method comprising the steps of:

determining a highest operator throughput as a maximum rate of wafers that can be processed per operator based on data from the lot tracking system;

determining a minimum number of operators that are needed to process wafers in the work center to achieve the manufacturing goal based on the wafer manufacturing goal and the highest operator throughput;

determining a number of working operators that are needed to process wafers in the work center to achieve the wafer manufacturing goal by increasing the minimum number of operators based on characteristics of the processing stations;

determining an operator availability based on an average number of working operators processing wafers and a number of all operators at the work center; and determining the total number of operators needed at the semiconductor wafer work center to achieve the wafer manufacturing goal based on the operator availability, the number of working operators, a work center operating time and a working time per operator.

11. A method according to claim 10, further comprising the step of setting the wafer manufacturing goal based on a rate of wafers that can be started in a product flow and a number of process steps in the product flow.

12. A method according to claim 10, wherein the step of determining the number of working operators comprises dividing the minimum number of operators by an operator cushion which is between 0 and 1.

13. A method of determining a total number of operators needed at a work center to achieve a manufacturing goal, the work center including a product tracking system and a plurality of processing stations for processing products to be manufactured, the method comprising the steps of:

setting the manufacturing goal;

determining a highest operator throughput as a maximum rate of products that can be processed per operator based on data from the product tracking system;

determining a minimum number of operators that are needed to process products in the work center to achieve the manufacturing goal based on the manufacturing goal and the highest operator throughput;

determining a number of working operators that are needed to process products in the work center to achieve the manufacturing goal by increasing the minimum number of operators based on characteristics of the processing stations;

determining an operator availability based on an average number of working operators processing products and a number of all operators at the work center; and determining the total number of operators needed at the work center to achieve the manufacturing goal based on the operator availability and the number of working operators.

14. A method according to claim 13, wherein the step of determining the total number of operators needed at the work center to achieve the manufacturing goal is also based on a work center operating time and a working time per operator.

15. A method according to claim 14, wherein the step of determining the total number of operators needed at the work center to achieve the manufacturing goal comprises multiplying the quotient of the number of working operators needed divided by the operator availability, by the quotient of the work center operating time divided by the working time per operator.

16. A method according to claim 13, wherein the step of setting the manufacturing goal is based on a rate of products that can be started in a product flow and a number of process steps in the product flow.

17. A method according to claim 13, wherein the step of determining the number of working operators comprises dividing the minimum number of operators by an operator cushion.

18. A method according to claim 17, wherein the operator cushion is between 0 and 1.

19. A method according to claim 17, wherein the operator cushion is a historical factor.

20. A method according to claim 13, wherein the step of determining the minimum number of operators comprises dividing the manufacturing goal by the highest operator throughput.

21. A method according to claim 13, wherein the step of determining the operator availability comprises dividing the average number of working operators by the number of all operators at the work center.

22. A system for determining a total number of operators needed at a semiconductor wafer work center to achieve a wafer manufacturing goal, the work center including a wafer lot tracking system and a plurality of processing stations for processing a plurality of lots of semiconductor wafers to be manufactured, the system comprising:

means for determining a highest operator throughput as a maximum rate of wafers that can be processed per operator based on data from the lot tracking system;

means for determining a minimum number of operators that are needed to process wafers in the work center to achieve the manufacturing goal based on the wafer manufacturing goal and the highest operator throughput;

means for determining a number of working operators that are needed to process wafers in the work center to achieve the wafer manufacturing goal by increasing the minimum number of operators based on characteristics of the processing stations;

means for determining an operator availability based on an average number of working operators and a number of all operators at the work center; and means for determining the total number of operators needed at the semiconductor wafer work center to achieve the wafer manufacturing goal based on the operator availability and the number of working operators.

23. A system according to claim 22, wherein the means for determining the total number of operators needed at the semiconductor work center to achieve the wafer manufacturing goal uses a work center operating time and a working time per operator.

24. A system according to claim 23, wherein the means for determining the total number of operators needed at the semiconductor work center to achieve the wafer manufacturing goal multiplies the quotient of the number of working operators needed divided by the operator availability, by the quotient of the work center operating time divided by the working time per operator.

25. A system according to claim 22, wherein the wafer manufacturing goal is based on a rate of wafers that can be started in a product flow and a number of process steps in the product flow.

26. A system according to claim 22, wherein the means for determining the number of working operators divides the minimum number of operators by an operator cushion.

27. A system according to claim 26, wherein the operator cushion is between 0 and 1.

28. A system according to claim 26, wherein the operator cushion is a historical factor.

29. A system according to claim 22, wherein the means for determining the minimum number of operators divides the wafer manufacturing goal by the highest operator throughput.

30. A system according to claim 22, wherein the means for determining the operator availability divides the average number of working operators by the number of all operators at the work center.

31. A system for determining a total number of operators needed at a work center to achieve a manufacturing goal, the work center including a product tracking system and a plurality of processing stations for processing products to be manufactured, the system comprising:

means for determining a highest operator throughput as a maximum rate of products that can be processed per operator based on data from the product tracking system;

means for determining a minimum number of operators that are needed to process products in the work center to achieve the manufacturing goal based on the manufacturing goal and the highest operator throughput;

means for determining a number of working operators that are needed to process products in the work center to achieve the manufacturing goal by increasing the minimum number of operators based on characteristics of the processing stations;

means for determining an operator availability based on an average number of working operators and a number of all operators at the work center; and means for determining the total number of operators needed at the work center to achieve the manufacturing goal based on the operator availability and the number of working operators.

32. A system according to claim 31, wherein the means for determining the total number of operators needed at the work center to achieve the manufacturing goal uses a work center operating time and a working time per operator.

33. A system according to claim 32, wherein the means for determining the total number of operators needed at the work center to achieve the manufacturing goal multiplies the quotient of the number of working operators needed divided by the operator availability, by the quotient of the work center operating time divided by the working time per operator.

34. A system according to claim 31, wherein the manufacturing goal is based on a rate of products that can be started in a product flow and a number of process steps in the product flow.

35. A system according to claim 31, wherein the means for determining the number of working operators divides the minimum number of operators by an operator cushion.

36. A system according to claim 35, wherein the operator cushion is between 0 and 1.

37. A system according to claim 35, wherein the operator cushion is a historical factor.

38. A system according to claim 31, wherein the means for determining the minimum number of operators divides the manufacturing goal by the highest operator throughput.

39. A system according to claim 31, wherein the means for determining the operator availability divides the average number of working operators by the number of all operators at the work center.

* * * * *